(12) United States Patent
Laqua et al.

(10) Patent No.: US 12,078,247 B2
(45) Date of Patent: Sep. 3, 2024

(54) PISTON BLANK, PISTON AND METHOD

(71) Applicant: KS Kolbenschmidt GmbH, Neckarsulm (DE)

(72) Inventors: Matthias Laqua, Bad Wimpfen (DE); Klaus Bacher, Billigheim-Allfeld (DE)

(73) Assignee: KS KOLBENSCHMIDT GMBH, Neckarsulm (DE)

(*) Notice: Subject to any disclaimer, the term of this patent is extended or adjusted under 35 U.S.C. 154(b) by 0 days.

(21) Appl. No.: 18/160,990

(22) Filed: Jan. 27, 2023

(65) Prior Publication Data
US 2023/0243423 A1 Aug. 3, 2023

(30) Foreign Application Priority Data
Jan. 28, 2022 (DE) ............... 10 2022 102 051.7

(51) Int. Cl.
*F16J 1/00* (2006.01)
*B23K 26/28* (2014.01)

(52) U.S. Cl.
CPC ............ *F16J 1/005* (2013.01); *B23K 26/28* (2013.01)

(58) Field of Classification Search
CPC ............ B23K 26/28; F16J 1/005; F02F 3/22
See application file for complete search history.

(56) References Cited

U.S. PATENT DOCUMENTS

| | | | | |
|---|---|---|---|---|
| 6,026,777 A | * | 2/2000 | Kemnitz | F02F 3/22 123/193.6 |
| 2007/0283917 A1 | * | 12/2007 | Lapp | F02F 3/22 123/193.6 |
| 2014/0238232 A1 | * | 8/2014 | Lapp | F02F 3/22 92/172 |

FOREIGN PATENT DOCUMENTS

| | | |
|---|---|---|
| DE | 102004061778 A1 | 4/2006 |
| DE | 102007005268 A1 | 8/2007 |
| DE | 102006031095 A1 | 1/2008 |
| DE | 102011013143 A1 | 9/2012 |
| DE | 102013218764 A1 | 9/2014 |
| WO | 0020747 A1 | 4/2000 |
| WO | 2015172880 A1 | 11/2015 |

* cited by examiner

*Primary Examiner* — Abiy Teka
(74) *Attorney, Agent, or Firm* — Alleman Hall & Tuttle LLP

(57) ABSTRACT

Piston blank for a piston, comprising a piston lower part, which comprises a first joining surface running around a central axis of the piston blank, and a piston upper part, which comprises a second joining surface running around the central axis and an inner surface running around the central axis and adjoining the second joining surface as viewed along the central axis, wherein the piston upper part can be placed with its second joining surface on the first joining surface, and wherein a tangential plane which is assigned to the second joining surface is inclined relative to the central axis such that the tangential plane intersects the inner surface.

14 Claims, 10 Drawing Sheets

PISTON BLANK, PISTON AND METHOD

FIELD

The present invention relates to a piston blank for a piston, a piston comprising such a piston blank, and a method for manufacturing such a piston using such a piston blank.

BACKGROUND

A piston for a combustion engine may have a piston lower part and a piston upper part separate from the piston lower part, which may be welded together to form the piston. A circumferential cooling channel may be provided between the piston lower part and the piston upper part for cooling the piston during operation of the combustion engine. If a weld seam for connecting the piston lower part to the piston upper part ends inside this cooling channel, this can lead to weld spatter forming inside the cooling channel, which is very difficult to remove from the cooling channel. If such weld spatter becomes detached during operation of the combustion engine, this can lead to damage to the piston and/or the combustion engine. This needs to be improved.

WO 00/20747 A1 describes a piston with a cooling channel. The piston comprises a piston body of forged steel with a box-shaped skirt, bosses and boss supports and connecting walls between the boss supports, as well as a combustion bowl. To increase the rigidity of a ring section of the piston, it comprises a circumferential wall above hub bores. A component is welded in between this wall and a piston crown to define the cooling channel.

WO 2015/172880 A1 shows a method for producing a piston for a combustion engine with at least two piston components, wherein the piston components are joined together along corresponding joining surfaces via at least one radially or axially circumferential laser weld.

SUMMARY

Against this background, one object of the present invention is to provide an improved piston blank for a piston.

Accordingly, a piston blank for a piston is proposed. The piston blank comprises a piston lower part, which comprises a first joining surface running around a central axis of the piston blank, and a piston upper part, which comprises a second joining surface running around the central axis and an inner surface running around the central axis and adjoining the second joining surface as viewed along the central axis, wherein the piston upper part can be placed with its second joining surface on the first joining surface, and wherein a tangential plane which is assigned to the second joining surface is inclined relative to the central axis in such a way that the tangential plane intersects the inner surface.

The fact that the tangential plane is inclined relative to the central axis makes it possible, when welding the piston lower part to the piston upper part, to align a laser beam used for welding in such a way that it runs in the tangential plane. This results in the laser beam being oriented into the upper part of the piston at one end of the joining surfaces. In the event that the joining surfaces end at a cooling channel of the piston, the laser beam thus does not run through the cooling channel but into the piston upper part, reliably preventing the formation of weld spatter inside the cooling channel.

The piston blank differs from the piston in that the piston lower part and the piston upper part are not yet joined together and can preferably be detached from each other again non-destructively. The piston lower part and the piston upper part are thus two separate components which are joined together, in particular welded together, to form the piston. To form the piston, the piston lower part and the piston upper part are joined together, preferably welded, in particular at the joining surfaces. The joining surfaces can be at least partially melted for this purpose.

The piston blank is essentially rotationally symmetrical about the central axis. "Essentially" in this context means in particular that parts or regions of the piston blank can also be of non-rotationally symmetrical design with respect to the central axis. The central axis may also be referred to as the axis of symmetry. In particular, the piston upper part is rotationally symmetrical about the central axis. The piston upper part can be annular.

The piston lower part and the piston upper part can be made of the same material or of different materials. Preferably, the piston lower part and/or the piston upper part is made of a steel alloy. However, other metallic materials are also suitable. The piston lower part can be a cast component. The piston upper part can be a turned part. Alternatively, the piston upper part can also be a cast component. The piston lower part can also be machined.

A "joining surface" in this context means a surface or area on which the piston lower part and the piston upper part are joined. In this context, "joining" means in particular connecting the piston lower part to the piston upper part. The connection that can be produced between the first joining surface and the second joining surface is a materially bonded connection. In the case of materially bonded connections, the connection partners are held together by atomic or molecular forces. Materially bonded joints are non-detachable joints that can only be separated by destroying the joining means and/or the joining partners. Materially bonded joints can be made, for example, by adhesive bonding, soldering, welding or vulcanization. As previously mentioned, the piston lower part and the piston upper part are preferably welded together.

The fact that the piston upper part can be "placed" with its second joining surface on the first joining surface means in particular that the piston upper part can rest with its second joining surface on the first joining surface. The piston lower part and the piston upper part can thus be assembled to form the piston blank and to produce the piston by placing or fitting the piston upper part onto the piston lower part. In doing so, the piston upper part can be pushed onto the piston lower part to such an extent that the first joining surface and the second joining surface contact each other and thus abut each other.

A "tangential plane" in this context means a plane that comprises a line-shaped contact with the second joining surface. The line-shaped contact runs at an angle to the central axis. Accordingly, the second joining surface is inclined relative to the central axis in accordance with the tangential plane. The inner surface of the piston upper part is preferably cylindrical. The inner surface is rotationally symmetrical relative to the central axis. The inner surface is preferably not inclined relative to the central axis.

The fact that the second joining surface "adjoins" the inner surface means in this context that, viewed along the central axis, no further surfaces or the like are arranged between the inner surface and the second joining surface. The inner surface merges into the second joining surface at a linear transition. In particular, the tangential plane intersects the inner surface at the transition. That the tangential plane "intersects" the inner surface means in particular that the tangential plane extends through the inner surface, in particular through the aforementioned transition, into the piston upper part.

The piston blank can be assigned a coordinate system with a width direction or x-direction, a height direction or y-direction and a depth direction or z-direction. The y-direction may also be referred to as the axial direction. The terms "y-direction" and "axial direction" are therefore arbitrarily interchangeable. The directions are oriented perpendicular to each other. In particular, the central axis coincides with the y-direction or is oriented parallel thereto. Furthermore, a radial direction can be assigned to the piston blank. The radial direction is oriented perpendicular to the central axis and points away from it. Viewed along the y-direction or along the central axis, respectively, the second joining surface and the inner surface can be placed next to each other or on top of each other. In particular, the second joining surface is placed above or above the inner surface.

According to one embodiment, the first joining surface is frustoconical, wherein the second joining surface is frustoconical, and wherein the inner surface is cylindrical at least in sections.

"Frustoconical" or "cone-shaped" means in the present case that both the first joining surface and the second joining surface are inclined relative to the central axis. The inner surface, on the other hand, is not inclined relative to the central axis. The first joining surface, the second joining surface and the inner surface are preferably rotationally symmetrical with respect to the central axis. Viewed along the radial direction, the first joining surface is arranged inside the second joining surface. "Cylindrical at least in sections" may be understood in connection with the inner surface to mean that the inner surface comprises one or more cylindrical sections. The sections may thus be part of a cylinder. The inner surface may thus be part of a cylinder, in particular part of a circular cylinder. In other words, the inner surface preferably comprises at least one or more cylindrical sections.

According to a further embodiment, the joining surfaces are designed in such a way that the piston lower part and the piston upper part can be joined at the joining surfaces with an interference fit.

This enables precise positioning of the piston upper part on the piston lower part. It is also possible to pre-assemble the piston upper part on the piston lower part by pressing the piston upper part onto the piston lower part. Separation of the piston upper part from the piston lower part is then only possible with a correspondingly high amount of force.

According to a further embodiment, the inner surface is part of a wall of a cooling channel provided between the piston lower part and the piston upper part.

During operation of a piston manufactured from the piston blank, oil, in particular engine oil, can be passed through this cooling channel to dissipate heat from the piston. The cooling channel runs toroidally around the central axis. The cooling channel is thus preferably rotationally symmetrical with respect to the central axis. The wall determines a geometry of the cooling channel. In addition to the inner surface of the piston upper part, a part of the second joining surface can also be part of the wall of the cooling channel. Furthermore, an outer surface of the piston lower part also forms part of this wall of the cooling channel.

According to a further embodiment, the tangential plane is arranged outside the cooling channel.

In particular, the tangential plane does not run through the cooling channel and preferably does not intersect it. In the case that the second joining surface is part of the wall of the cooling channel, the line-shaped contact between the tangential plane and the second joining surface can be adjacent to the cooling channel. That is, the tangential plane may partially abut the wall of the cooling channel, but does not intersect it.

According to a further embodiment, the joining surfaces end at the cooling channel or within the cooling channel.

In particular, the first joining surface ends at the cooling channel. In other words, the first joining surface does not run into the cooling channel. The second joining surface can, as previously mentioned, be at least part of the wall of the cooling channel. In this case, the second joining surface ends inside the cooling channel.

According to another embodiment, the tangential plane is inclined at an angle of inclination of 1 to 8° relative to the central axis.

Alternatively, the tangential plane may be inclined at an angle of inclination greater than 8° or less than 1° relative to the central axis. Preferably, the angle of inclination is an acute angle. By an "acute angle" is meant in the present context an angle of less than 90°. By "angle of inclination" is meant in the present case an angle provided between the tangential plane and the central axis. Likewise, the previously mentioned line-shaped contact between the tangential plane and the second joining surface is inclined at the angle of inclination relative to the central axis. Accordingly, the two joining surfaces are also inclined at the angle of inclination relative to the central axis.

According to a further embodiment, the lower part of the piston comprises a rounding adjoining the first joining surface.

The rounding can be part of the wall of the cooling channel. The rounding can have a radius of 0.5 to 1 mm, for example. The rounding preferably runs completely around the central axis.

According to a further embodiment, the piston lower part comprises a shoulder for placing the piston upper part on the piston lower part.

In particular, the piston upper part comprises a first end surface facing away from the piston lower part and a second end surface facing the piston lower part. The second end surface of the piston upper part rests on the shoulder of the piston lower part.

According to a further embodiment, the shoulder is arranged at a distance from the joining surfaces as viewed along the central axis.

Thus, viewed along the y-direction, the shoulder is placed at a distance from the joining surfaces.

According to another embodiment, the shoulder is oriented perpendicular to the central axis.

In particular, the shoulder runs annularly around the central axis. In particular, the shoulder lies in a plane perpendicular to the central axis. The shoulder is preferably rotationally symmetrical to the central axis.

According to a further embodiment, the shoulder comprises a groove running around the central axis, wherein the piston lower part comprises a rib running around the central axis, which rib can be received in the groove in order to connect the piston lower part to the piston upper part in a form-fitting manner.

The groove is in particular an annular groove or can be designated as an annular groove. The rib and the groove engage positively with one another to connect the lower part of the piston to the upper part of the piston and thus to form the piston. A positive connection is formed by at least two connecting partners engaging in each other or behind each other. With the aid of the groove and the rib, it is possible to position the piston upper part precisely on the piston lower part. In particular, the piston upper part is positively fixed to the piston lower part of the piston when viewed along the radial direction of the piston blank. However, viewed along the central axis or the y-direction, the piston upper part can be lifted off the piston lower part.

According to a further embodiment, the groove and the rib each have a V-shaped geometry in cross section.

Alternatively, the groove and the rib can each have a geometry that is semicircular or rectangular in cross section. However, any cross-sectional geometry of the groove and the rib can be selected. In particular, a tongue-and-groove connection can be realized with the aid of the groove and the rib. The groove can be an annular groove and therefore also be designated as such. The rib can also be referred to as a web. Both the groove and the rib are preferably rotationally symmetrical with respect to the central axis.

According to a further embodiment, a groove running around the central axis is provided at a level of the shoulder, wherein the groove is worked both partially into the piston upper part and the piston lower part.

In particular, the second end surface of the piston upper part and the shoulder of the piston lower part end in the previously mentioned groove. In the event that the piston upper part and the piston lower part are not welded together at the shoulder and at the second end surface, it is possible that oil escaping from the cooling channel between the piston upper part and the piston lower part can escape from the piston via the groove. The connection between the piston lower part and the piston upper part at the shoulder of the piston lower part and at the second end surface of the piston upper part can thus be free of a weld seam or without a weld seam. In this case, only a positive connection between the piston lower part and the piston upper part is provided at the shoulder and the second end surface. Viewed along the y-direction, the groove is arranged below a ring field of the piston. The ring field may be provided on the piston upper part. The groove is an annular groove and can therefore also be referred to as an annular groove.

According to a further embodiment, the piston upper part is annular and incorporates the piston lower part at least in sections.

The piston upper part is therefore rotationally symmetrical to the central axis. The piston upper part can be a turned part, for example. However, the piston upper part can also be a cast component.

Furthermore, an alternative embodiment of a piston blank for a piston is proposed. The piston blank comprises a piston lower part, which comprises a first joining surface extending around a central axis of the piston blank, a piston upper part, which comprises a second joining surface extending around the central axis, and a cooling channel provided between the piston lower part and the piston upper part, wherein the piston upper part can be placed with its second joining surface on the first joining surface, and wherein the joining surfaces are inclined relative to the central axis in such a way that a laser beam used for welding the joining surfaces does not pass through the cooling channel.

This means in particular that the laser beam can be arranged parallel to the joining surfaces due to the inclination of the joining surfaces. In particular, the laser beam runs in the previously mentioned tangential plane. Since the joining surfaces are inclined to the central axis, the laser beam runs into the piston upper part when the piston lower part is welded to the piston upper part, so that the laser beam does not run through the cooling channel. The fact that the laser beam "does not pass through" the cooling channel means in particular that the laser beam passes by the cooling channel. The formulation "does not pass through the cooling channel" can accordingly be replaced by the formulation "passes by the cooling channel".

Furthermore, a piston with such a piston blank is proposed, wherein the piston lower part and the piston upper part are welded to each other at the joining surfaces by means of a weld seam.

The weld seam is in particular a laser weld seam. The terms "weld seam" and "laser weld seam" can therefore be used interchangeably as desired. After welding the piston lower part to the piston upper part, the weld seam can be machined, for example, before the piston is finished. The weld seam is preferably rotationally symmetrical to the previously mentioned central axis. The central axis may be associated with the piston. The weld seam preferably ends before the cooling channel. However, the weld seam can also run into the cooling channel.

Furthermore, a method for manufacturing such a piston using such a piston blank is proposed. The method comprises the following steps: a) providing the piston blank, which comprises a piston lower part, which comprises a first joining surface running around a central axis of the piston blank, and a piston upper part, which comprises a second joining surface running around the central axis and an inner surface running around the central axis and adjoining the second joining surface as viewed along the central axis, wherein a tangential plane which is assigned to the second joining surface is inclined relative to the central axis in such a way that the tangential plane intersects the inner surface, b) placing the piston upper part with its second joining surface on the first joining surface, and c) welding the piston lower part to the piston upper part at the joining surfaces.

Step a) may comprise manufacturing the piston blank. During the manufacturing of the piston blank, the piston lower part and the piston upper part are manufactured. As previously mentioned, the piston lower part and the piston upper part may be manufactured, for example, by means of a casting method. Alternatively, the piston lower part and the piston upper part can also be manufactured by means of an ablative manufacturing method. Providing the piston blank also includes machining and/or finishing the joining surfaces. When the piston upper part is placed on the piston lower part in step b), the piston upper part can be pressed onto the piston lower part. Step c) is preferably carried out with the aid of a welding device. The welding device preferably operates in an automated manner. The welding device may be a laser welding device. Therefore, the welding device may also be referred to as a laser welding device.

According to one embodiment, step c) is carried out in such a way that a laser beam generated during step c) for welding lies in the tangential plane.

Because the laser beam lies in the tangential plane, the laser beam does not pass through the cooling channel after welding through the joining surfaces up to the cooling channel, but runs into the upper part of the piston. This reliably prevents the formation of weld spatter in the cooling channel itself.

In addition, a combustion engine with such a piston is proposed.

The combustion engine may comprise multiple pistons. For example, the combustion engine comprises three, four, five, six, or more than six pistons. The combustion engine may comprise an engine block comprising piston bores therein for receiving the pistons.

In addition, a motor vehicle with such a piston and/or with such a combustion engine is proposed.

The vehicle can be a hybrid vehicle. However, the vehicle can also be driven purely by means of the combustion engine. The vehicle is preferably a passenger car. However, the vehicle may also be a commercial vehicle, such as a truck. Furthermore, the vehicle may also be an aircraft, a watercraft, or a rail vehicle.

The embodiments and features described for the proposed piston blank apply mutatis mutandis to the proposed piston, the proposed method, the proposed combustion engine, and the proposed vehicle, and vice versa.

In the present context, "one" is not necessarily to be understood as being limited to exactly one element. Rather, several elements, such as two, three or more, may also be provided. Also, any other counting word used herein is not to be understood as limiting to exactly the number of elements mentioned. Rather, numerical deviations upwards and downwards are possible, unless otherwise indicated.

Further possible implementations of the piston blank, the piston, the method, the combustion engine and/or the vehicle also include combinations of features or embodiments described previously or below with regard to the embodiment examples that are not explicitly mentioned. In this context, the skilled person will also add individual aspects as improvements or additions to the respective basic form of the piston blank, the piston, the method, the combustion engine and/or the vehicle.

Further advantageous embodiments and aspects of the piston blank, the piston, the method, the combustion engine and/or the vehicle are the subject of the subclaims and of the examples of embodiment of the piston blank, the piston, the method, the combustion engine and/or the vehicle described below. Furthermore, the piston blank, the piston, the method, the combustion engine and/or the vehicle are explained in more detail on the basis of preferred embodiments with reference to the accompanying figures.

DETAILED DESCRIPTION

In the figures, identical or functionally identical elements have been given the same reference signs unless otherwise indicated.

Figure 1:
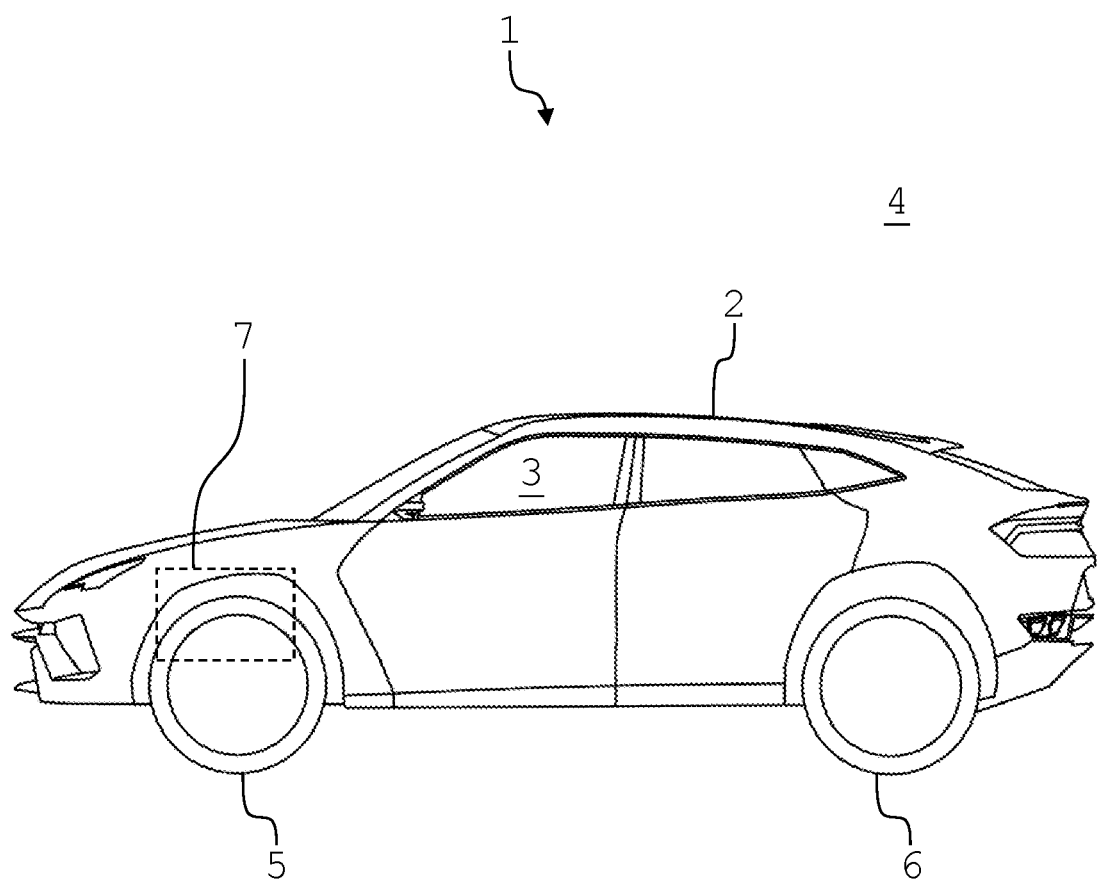
FIG. 1 shows a schematic side view of an embodiment of a vehicle.

FIG. 1 shows a schematic side view of an embodiment of a vehicle 1. The vehicle 1 is a motor vehicle, in particular a passenger car. The vehicle 1 may also be a commercial vehicle, for example a truck, a harvester or a construction machine. Furthermore, the vehicle 1 may also be a military vehicle. Additionally, the vehicle 1 may also be an aircraft, a watercraft, or a rail vehicle. In the following, however, it is assumed that the vehicle 1 is a motor vehicle, in particular a passenger car.

The vehicle 1 includes a body 2 that encloses a passenger compartment or vehicle interior 3 of the vehicle 1. The vehicle interior 3 may contain a driver and passengers. The body 2 delimits an environment 4 of the vehicle 1 from the vehicle interior 3. The vehicle interior 3 is accessible from the environment 4 by means of doors.

The vehicle 1 comprises a chassis with several wheels 5, 6. The number of wheels 5, 6 is basically arbitrary. Preferably, the vehicle 1 comprises four wheels 5, 6. However, the vehicle 1 may for example have six wheels 5, 6. The wheels 5, 6 are part of a chassis of the vehicle 1. Only two wheels 5, 6 may be driven. However, all wheels 5, 6 may also be driven. In this case, the vehicle 1 is an all-wheel drive vehicle.

The vehicle 1 comprises an internal combustion engine or combustion engine 7. The combustion engine 7 may be a diesel engine or a gasoline engine. The vehicle 1 may be powered purely by the combustion engine 7. However, the vehicle 1 may also be a hybrid vehicle. In this case, the vehicle 1 comprises at least one electric motor in addition to the combustion engine 7. The combustion engine 7 comprises an engine block and a plurality of pistons received in piston bores of the engine block. For example, the combustion engine 7 may have three, four, five, six or more than six pistons.

Figure 2:
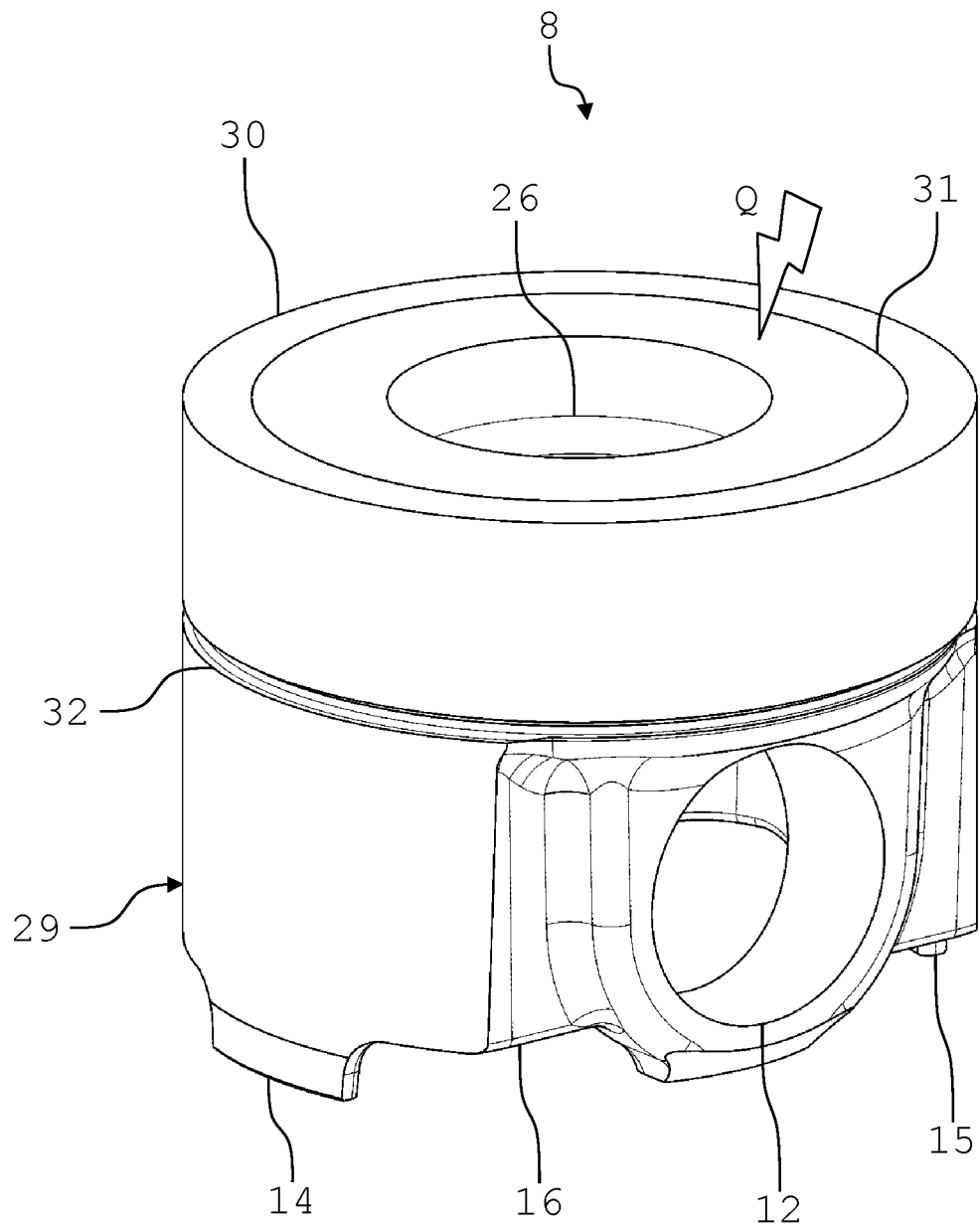
FIG. 2 shows a schematic perspective view of an embodiment of a piston for the vehicle according to FIG. 1.
Figure 3:
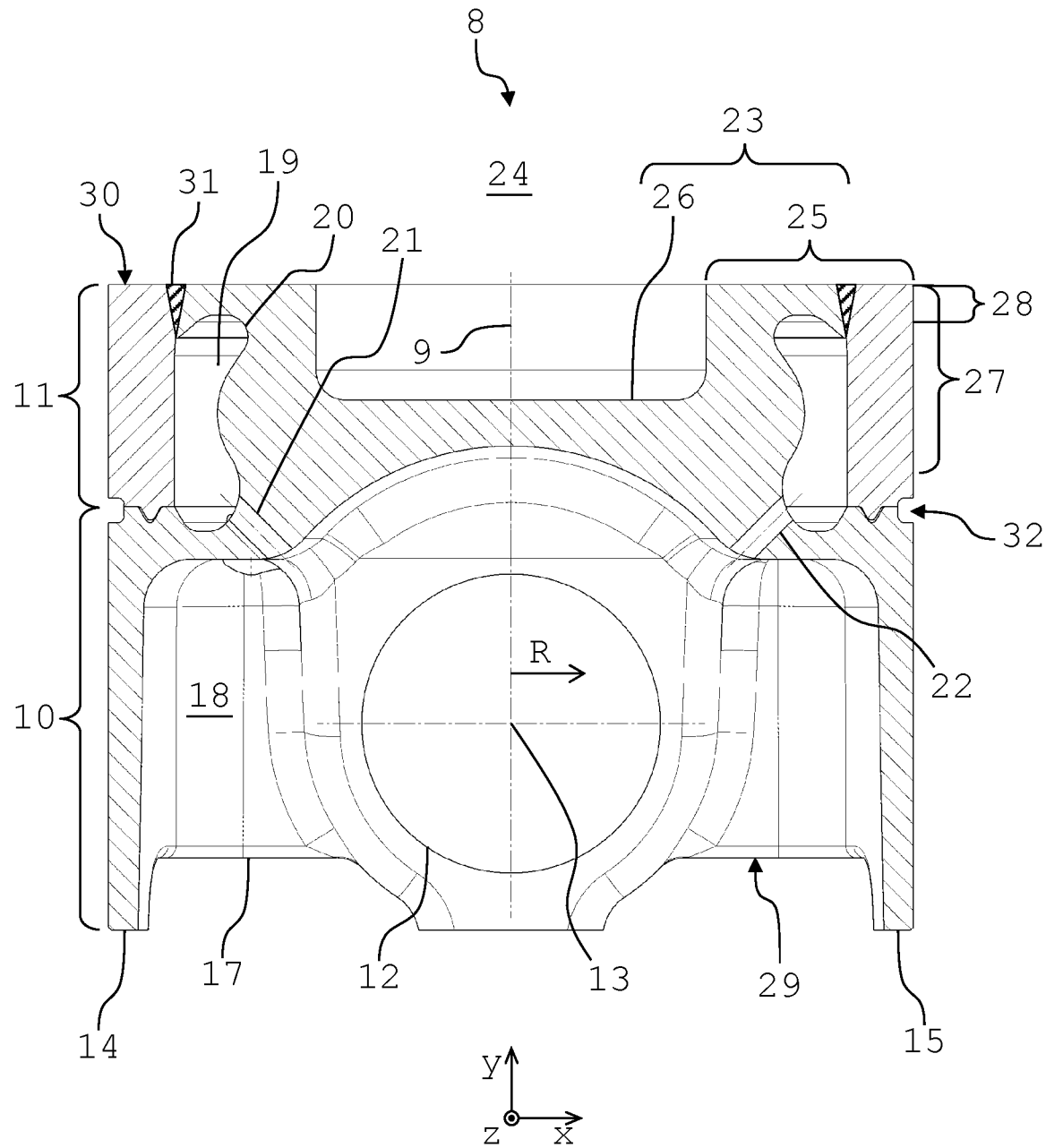
FIG. 3 shows a schematic sectional view of the piston according to FIG. 2.

FIG. 2 shows a schematic perspective view of an embodiment of a piston 8 for the combustion engine 7. FIG. 3 shows a schematic sectional view of the piston 8. In the following, reference is made to FIGS. 2 and 3 simultaneously.

The piston 8 comprises a symmetry or central axis 9, to which the piston 8 is essentially rotationally symmetrical. The piston 8 is assigned a coordinate system with a width direction or x-direction x, a height direction or y-direction y, and a depth direction or z-direction z. The y-direction y may also be referred to as the axial direction. The terms "y-direction" and "axial direction" are therefore arbitrarily interchangeable. The directions x, y, z are oriented perpendicular to each other. In particular, the central axis 9 coincides with the y-direction y or is oriented parallel to it. A radial direction R is also assigned to the piston 8. The radial direction R is oriented perpendicular to the central axis 9 and points away from it.

The piston 8 comprises a piston foot or piston shaft 10 and a piston head 11. Viewed along the central axis 9, the piston shaft 10 is arranged below the piston head 11. The piston shaft 10 comprises a piston eye or piston hub 12 in which a pin, not shown, can be received for coupling the piston 8 to a connecting rod, not shown, of the combustion engine 7. A symmetry or central axis 13 of the piston hub 12 intersects the central axis 9 and is oriented perpendicularly thereto. The central axis 13 coincides with the z-direction z or is oriented parallel thereto.

In the orientation of FIG. 3, a respective shaft section 14, 15 is provided on both sides of the piston hub. A first shaft section 14 and a second shaft section 15 are provided. The shaft sections 14, 15 are cylindrical in shape in sections. In other words, the shaft sections 14, 15 form part of a cylinder which is rotationally symmetrical with respect to the central axis 9. The shaft sections 14, 15 are thus constructed rotationally symmetrically with respect to the central axis 9.

However, the shaft sections 14, 15 do not form a complete cylinder. One of the shaft sections 14, 15 forms a pressure side of the piston 8, with the other of the shaft sections 14, 15 forming a counterpressure side of the piston 8.

The shaft sections 14, 15 are connected to each other by means of wall sections 16, 17. A first wall section 16 and a second wall section 17 are provided. The radial direction R points outward away from the central axis 9 in the direction of the shaft sections 14, 15. The piston hub 12 penetrates the wall sections 16, 17. The shaft sections 14, 15 and the wall sections 16, 17 enclose an interior 18 of the piston shaft 10. The interior 18 is open downwards in the orientation of FIG. 3. The previously mentioned pin for coupling the piston 8 to the connecting rod passes through the interior 18 along the central axis 13.

The piston 8 comprises a cooling channel 19 which runs completely around the central axis 9 and is rotationally symmetrical to it. The cooling channel 19 is in particular toroidal in shape. The cooling channel 19 comprises a wall 20 which defines a geometry or a cross-sectional geometry of the cooling channel 19. Oil, in particular engine oil, can be passed through the cooling channel 19 in order to dissipate heat Q introduced into the piston 8 during operation thereof.

The cooling channel 19 is in fluid communication with the interior 18 by means of several bores 21, 22. The number of bores 21, 22 is basically arbitrary. Preferably, several bores 21, 22 are provided which are evenly distributed around the central axis 9. For example, during operation of the piston 8 in the orientation of FIG. 3, oil can be injected into the interior 18 from below. At least part of the oil passes through the bores 21, 22 into the cooling channel 19 and out of it again. Heat Q is then dissipated with the oil.

The piston head 11 comprises a piston crown 23 which faces a cylinder head cover of the combustion engine 7. A large part of the heat Q is also introduced into the piston crown 23. In particular, the piston crown 23 faces a combustion chamber 24 of the combustion engine 7. The piston crown 23 comprises an annular piston crown section 25 that spans a plane oriented perpendicular to the central axis 9. Furthermore, the piston crown 23 comprises a combustion bowl 26 which is set back with respect to the piston crown section 25. Viewed along the central axis 9 or along the y-direction y, the combustion bowl 26 is thus offset with respect to the piston crown section 25.

A ring section or ring field 27 is provided on the piston head 11. The ring field 27 forms in particular a cylindrical outer surface of the piston head 11, which is rotationally symmetrical to the central axis 9. The ring field 27 comprises a plurality of annular grooves (not shown) arranged one above the other as viewed along the y-direction y, which are suitable for receiving piston rings. For example, two or three such annular grooves are provided. A fire bar 28 adjoining the piston crown 23 is part of the ring field 27. However, the fire bar 28 does not have an annular groove as previously mentioned for receiving a piston ring.

The piston 8 is in two parts and comprises a piston lower part 29 and a piston upper part 30. The piston lower part 29 and the piston upper part 30 are two separate components which are joined together by a material bond to form the piston 8. In the case of materially bonded connections, the connecting partners are held together by atomic or molecular forces. Materially bonded connections are non-detachable connections which can only be separated from each other again by destroying the connecting means and/or the connecting partners. Materially bonded joints can be made, for example, by adhesive bonding, soldering or welding.

The piston lower part 29 is connected to the piston upper part 30 by means of a weld seam 31 which rotates symmetrically around the central axis 9. The weld seam 31 is a laser weld seam. Therefore, the weld seam 31 may also be referred to as a laser weld seam. The weld seam 31 comprises a V-shaped cross-section. The weld seam 31 faces the piston crown 23. The weld seam 31 may be part of the piston crown 23. The weld seam 31 may terminate in the cooling channel 19. However, viewed along the y-direction y, the weld seam 31 may also end before the cooling channel 19.

The piston lower part 29 forms the piston shaft 10 and part of the piston head 11. The piston upper part 30 forms part of the piston head 11. The piston upper part 30 is annular and rotationally symmetrical to the central axis 9. The combustion bowl 26 is part of the piston lower part 29. The piston crown section 25 of the piston crown 23 is formed partly by the piston upper part 30 and partly by the piston lower part 29. The ring field 27 is provided on the piston upper part 30.

A groove 32 is provided between the piston shaft 10 and the piston head 11 or between the piston lower part 29 and the piston upper part 30, respectively, which runs around the central axis 9. In the orientation of FIG. 3, the groove 32 is positioned below the ring field 27. The groove 32 is an annular groove and can therefore also be referred to as an annular groove. The groove 32 is partly incorporated in the piston lower part 29 and partly in the piston upper part 30.

Figure 4:
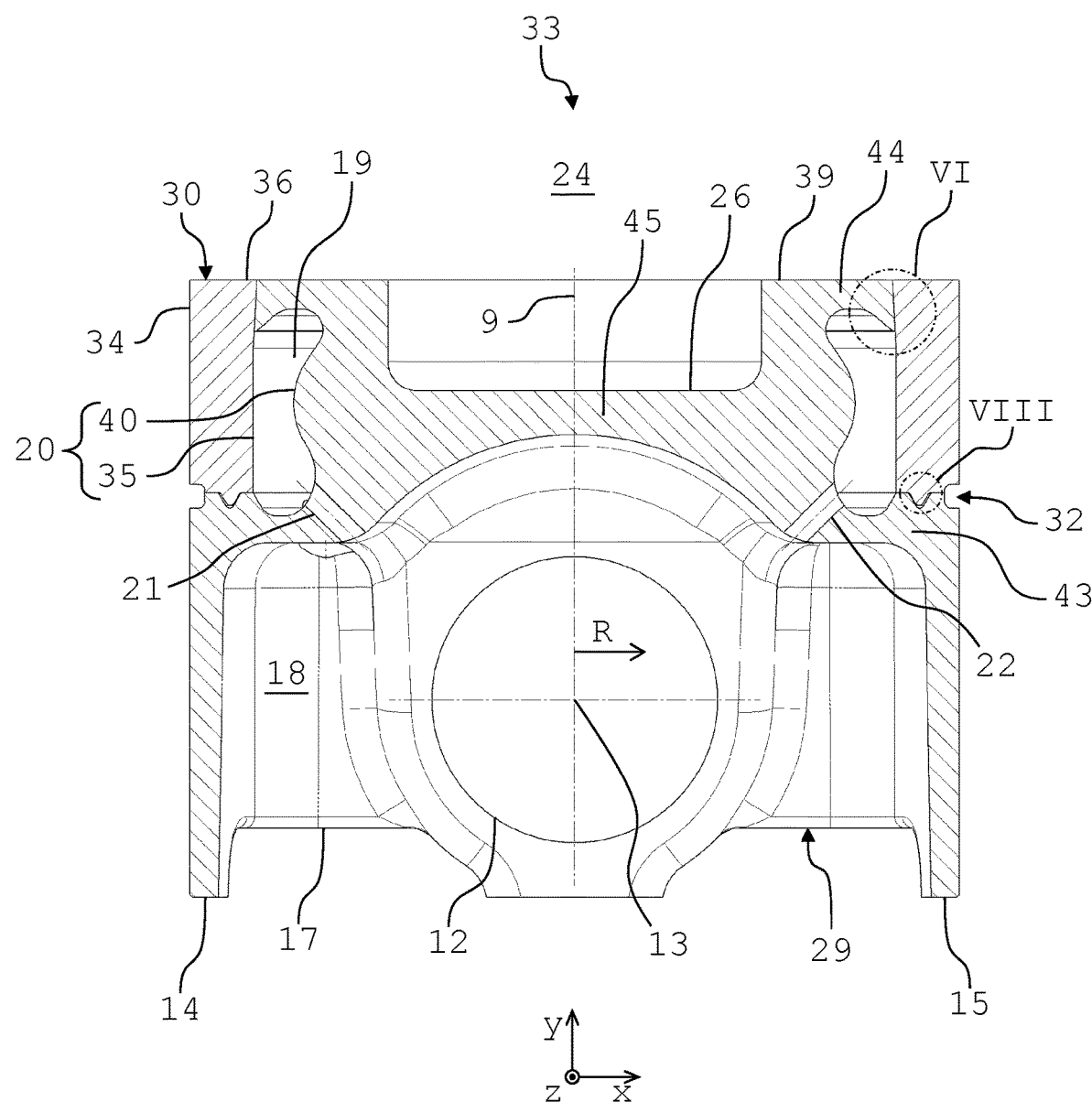
FIG. 4 shows a schematic sectional view of an embodiment of a piston blank for the piston according to FIG. 2.
Figure 5:
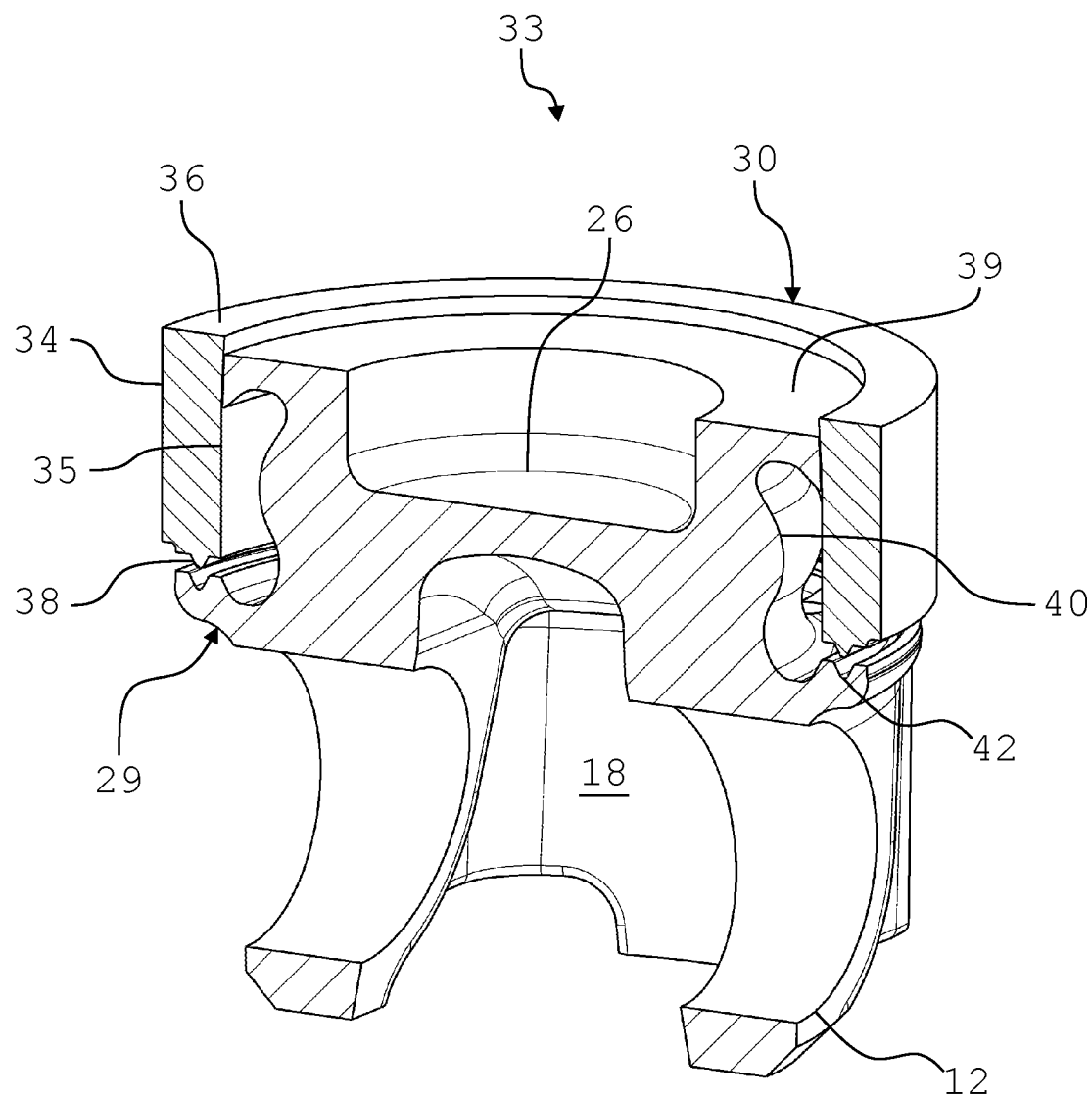
FIG. 5 shows a cutaway perspective exploded view of the piston blank according to FIG. 4.
Figure 6:
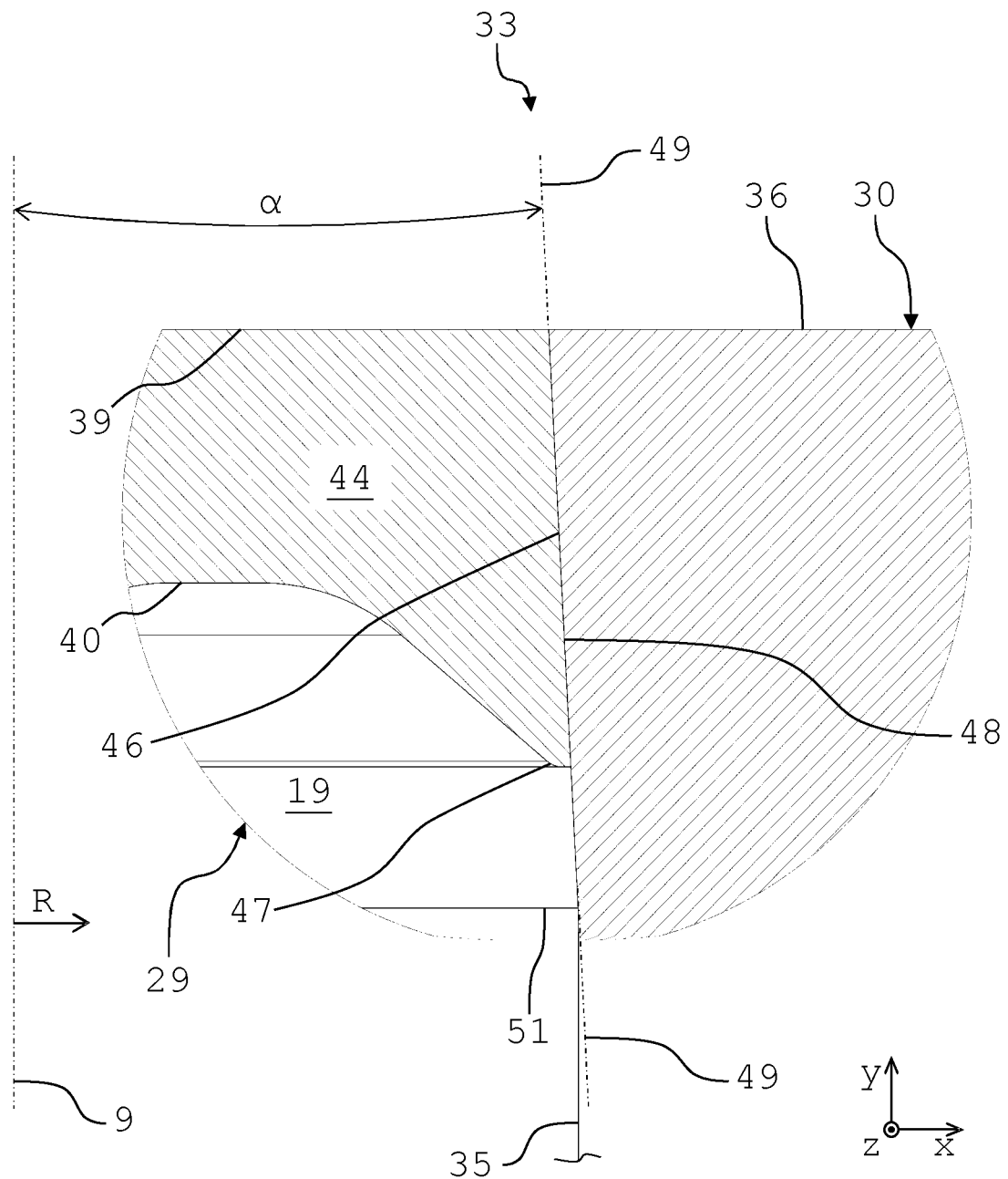
FIG. 6 shows the detailed view VI according to FIG. 4.
Figure 7:
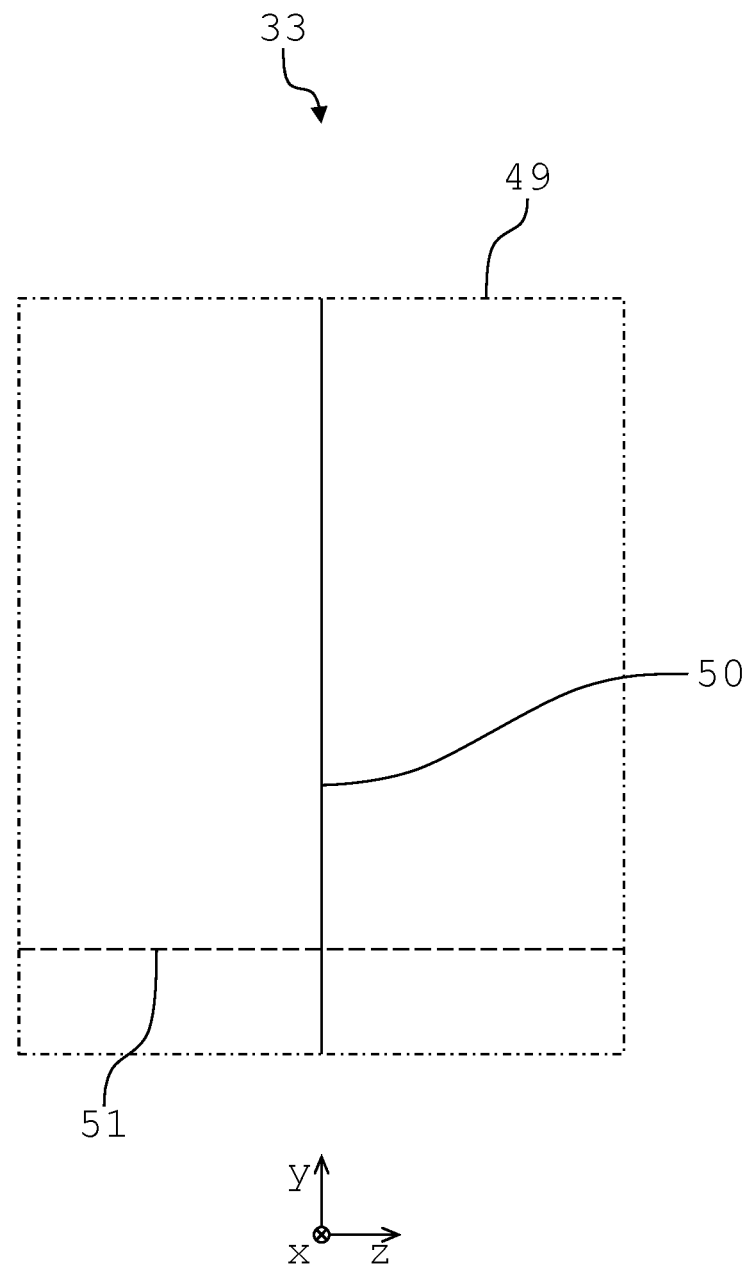
FIG. 7 shows a highly schematic view of the piston blank according to FIG. 4.
Figure 8:
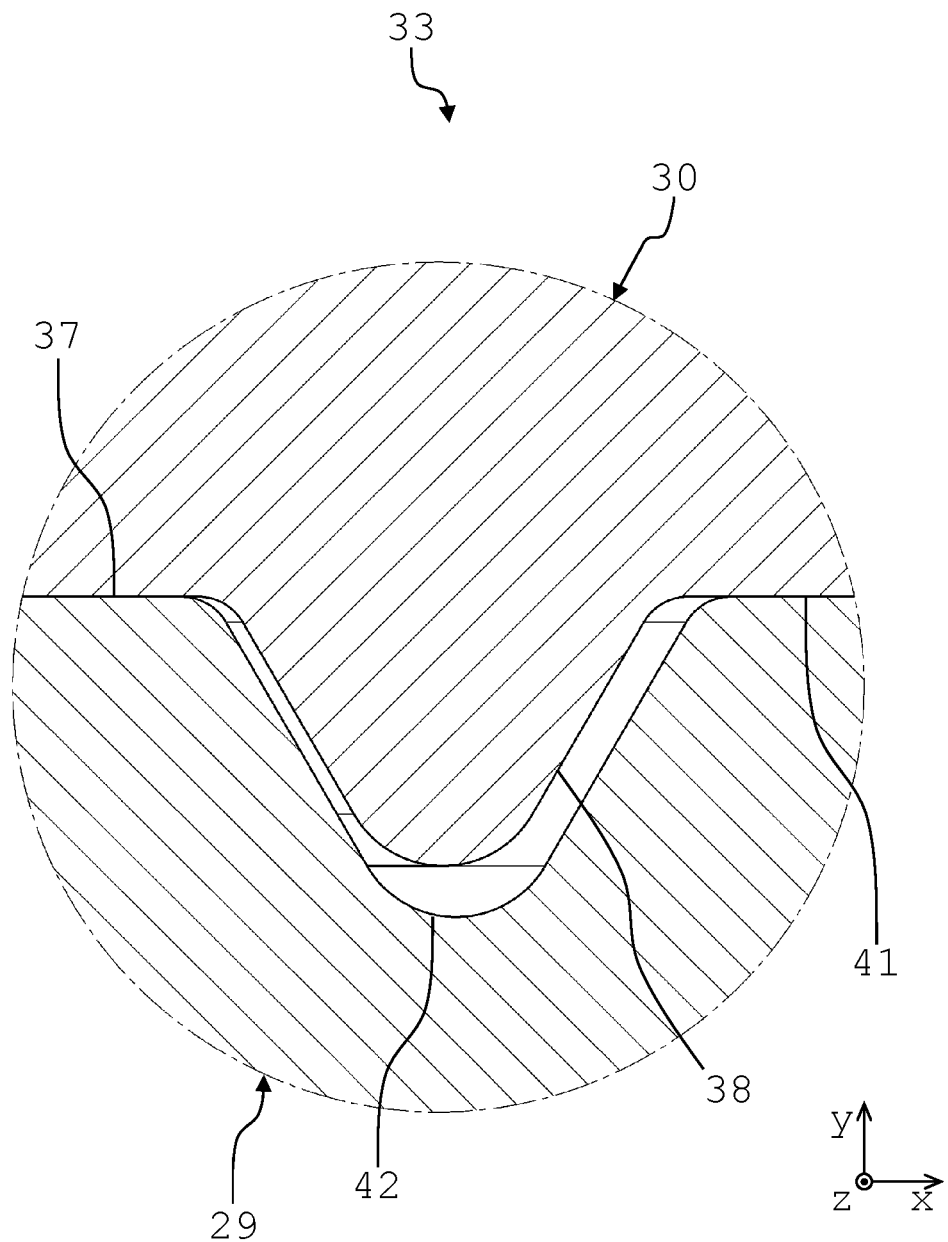
FIG. 8 shows the detailed view VIII according to FIG. 4.

FIG. 4 shows a schematic sectional view of an embodiment of a piston blank 33 for the piston 8. FIG. 5 shows a sectional perspective exploded view of the piston blank 33. FIG. 6 shows the detailed view VI according to FIG. 4. FIG. 7 shows a highly schematized view of the piston blank 33. FIG. 8 shows the detailed view VIII according to FIG. 4. In the following, reference is made to FIGS. 4 to 8 at the same time.

The piston 8 can be manufactured from the piston blank 33. The piston blank 33 differs from the piston 8 in that the piston lower part 29 is not yet connected to the piston upper part 30 by means of the weld seam 31. The piston blank 33 may additionally differ from the piston 8 in that the piston 8 is machined after welding the piston lower part 29 to the piston upper part 30. The central axis 9 may be associated with the piston blank 33. Also the previously mentioned coordinate system with the directions x, y, z may be assigned to the piston blank 33. Furthermore, the radial direction R can also be assigned to the piston blank 33.

As previously mentioned, the piston lower part 29 and the piston upper part 30 are two separate components which can be joined together, in particular welded, with the aid of the weld seam 31. The piston lower part 29 and the piston upper part 30 can, for example, each be made of a steel alloy. Different steel alloys or the same steel alloy can be used for the piston lower part 29 and the piston upper part 30. However, aluminum alloys can also be used.

The piston lower part 29 and the piston upper part 30 are each one-piece, in particular integral components. "One-piece" or "one-part" means in the present case that the piston lower part 29 and the piston upper part 30 are each not composed of different subcomponents, but each form a single component. "Integral" in this context means that the piston lower part 29 and the piston upper part 30 are each made of the same material throughout. The piston 8 itself or the piston blank 33, on the other hand, is multi-part. The piston lower part 29 is preferably a cast component. The piston upper part 30 can also be a cast component. Alternatively, the piston upper part 30 can also be a turned part or the like.

Viewed in the radial direction R, the cooling channel 19 is placed between the piston lower part 29 and the piston upper part 30. The piston upper part 30 is rotationally symmetrical to the central axis 9 and comprises an external circular cylindrical outer surface 34. The ring field 27 and the fire bar 28 are provided on the outer surface 34. Facing the cooling channel 19, the piston upper part 30 comprises an inner surface 35 extending around the central axis 9. The inner surface 35 is circular cylindrical in shape. The inner surface 35 is part of the wall 20 of the cooling channel 19.

Facing the combustion chamber 24, the piston upper part 30 comprises a first end face or first end surface 36, which is part of the piston crown 23, in particular part of the piston crown section 25. Facing away from the first end surface 36 and thus facing the piston lower part 29, the piston upper part 30 comprises a second end face or second end surface 37 (FIG. 8). With the second end surface 37, the piston upper part 30 rests on the piston lower part 29. A web or rib 38 extends out of the second end surface 37 in the direction of the piston lower part 29. The rib 38 runs completely around the central axis 9. The rib 38 is thus rotationally symmetrical with respect to the central axis 9. In cross-section, the rib 38 comprises a V-shaped geometry.

The piston lower part 29 includes an end face or end surface 39 which, together with the first end surface 36 of the piston upper part 30, forms the piston crown section 25. The combustion bowl 26 is also integrally formed on the piston lower part 29. The cooling channel 19 is integrally formed on the piston lower part 29 and, viewed along the radial direction R, is outwardly bounded by the piston upper part 30 or the inner surface 35 of the piston upper part 30. The piston lower part 29 comprises a curved inner surface 40 which, together with the inner surface 35 of the piston upper part 30, forms the wall 20 of the cooling channel 19.

Viewed along the y-direction y, a shoulder 41 (FIG. 8) running around the central axis 9 is provided on the piston lower part 29 below the end surface 39. The shoulder 41 forms a plane which is oriented perpendicular to the y-direction y. The second end surface 37 of the piston upper part 30 can rest on the shoulder 41. Viewed along the radial direction R, the shoulder 41 lies further out than the end surface 39. The shoulder 41 comprises a groove 42 running around the central axis 9. The groove 42 is an annular groove and can therefore also be referred to as an annular groove. In cross-section, the groove 42 comprises a V-shaped geometry.

The groove 42 is designed to receive the rib 38 of the piston upper part 30. With the aid of the rib 38 and the groove 42, the piston lower part 29 and the piston upper part 30 can be positively connected to one another. A positive connection is created by at least two connecting partners engaging in one another or behind one another. With the aid of the rib 38 and the groove 42, it is possible to fix the piston upper part 30 to the piston lower part 29, as viewed along the radial direction R. However, along the y-direction y, the piston upper part 30 can be lifted off the piston lower part 29. With the aid of the rib 38 and the groove 42, a tongue-and-groove connection between the piston lower part 29 and the piston upper part 30 can be realized. The groove 32 is provided at the level of the shoulder 41. The shoulder 41 and the second end surface 37 respectively run up to the groove 32 and end at it.

The shoulder 41 is provided on a web 43 of the piston lower part 29 which extends around the central axis 9. The shaft sections 14, 15 and the wall sections 16, 17 extend out from the web 43 in the orientation of FIG. 4 below. The cooling channel 19 is also partially formed on the web 43.

Viewed along the y-direction y, another web 44 is provided above the web 43. A part of the cooling channel 19 is also formed on the web 44. The web 44 comprises the end surface 39. A base section 45 of the piston lower part 29 supports the two webs 43, 44. The base section 45 separates the interior 18 from the combustion bowl 26.

A first joining surface 46 (FIG. 6) is provided on the web 44 of the piston lower part 29, which faces the piston upper part 30 radially and rotates around the central axis 9. The first joining surface 46 is rotationally symmetrical to the central axis 9. The first joining surface 46 is frustoconical or conical. In particular, this means that the first joining surface 46 is inclined at an angle of inclination $\alpha$ with respect to the central axis 9. The angle of inclination $\alpha$ can be 1 to 8°.

A rounding 47 provided on the web 44 adjoins the first joining surface 46. The rounding 47 may have a radius of 0.5 to 1 mm, for example. The rounding 47 merges with the inner surface 40 of the piston lower part 29. The rounding 47 is thus part of the wall 20 of the cooling channel 19. The rounding 47 runs completely around the central axis 9.

Now returning to the piston upper part 30, the latter comprises a second joining surface 48 (FIG. 6) which rests on or abuts the first joining surface 46 of the piston lower part 29. The second joining surface 48 is also conical or frustoconical. The second joining surface 48 is also inclined at an angle of inclination $\alpha$ with respect to the central axis 9. The piston lower part 29 and the piston upper part 30 can be joined at the joining surfaces 46, 48 with an interference fit. This means that the piston upper part 30 can be pressed onto the piston lower part 29.

Viewed along the y-direction y, the second joining surface 48 directly adjoins the inner surface 35 of the piston upper part 30. In other words, the inner surface 35, which is cylindrical, merges into the conical or frustoconical second joining surface 48. The second joining surface 48 extends into the cooling channel 19, so that the second joining surface 48 forms part of the wall 20 of the cooling channel 19.

A tangential plane 49 is assigned to the second joining surface 48. A "tangential plane" in this context means a plane which is in contact with the second joining surface 48 by means of a line-shaped contact 50 (FIG. 7). The line-shaped contact 50 is a straight line. The line-shaped contact 50 lies in the tangential plane 49 and is accordingly inclined at the angle of inclination $\alpha$ with respect to the central axis 9. The tangential plane 49 is also inclined at the angle of inclination $\alpha$ relative to the central axis 9. Any number of tangential planes 49 may be provided.

At a transition 51 between the inner surface 35 and the second joining surface 48, the tangential plane 49 intersects the inner surface 35, so that the tangential plane 49 or the line-shaped contact 50 runs inside the piston upper part 30 from the transition 51. In other words, the tangential plane 49 intersects the piston upper part 30. The tangential plane 49 is thus arranged outside the cooling channel 19, or the line-shaped contact 50 lies in the second joining surface 48 and thus adjoins the cooling channel 19. "Outside" the cooling channel 19 is accordingly to be understood as meaning that the tangential plane 49 does not intersect the cooling channel 19 or does not extend through it. However, this does not preclude the line-shaped contact 50 from being located in the second joining surface 48.

Figure 9:
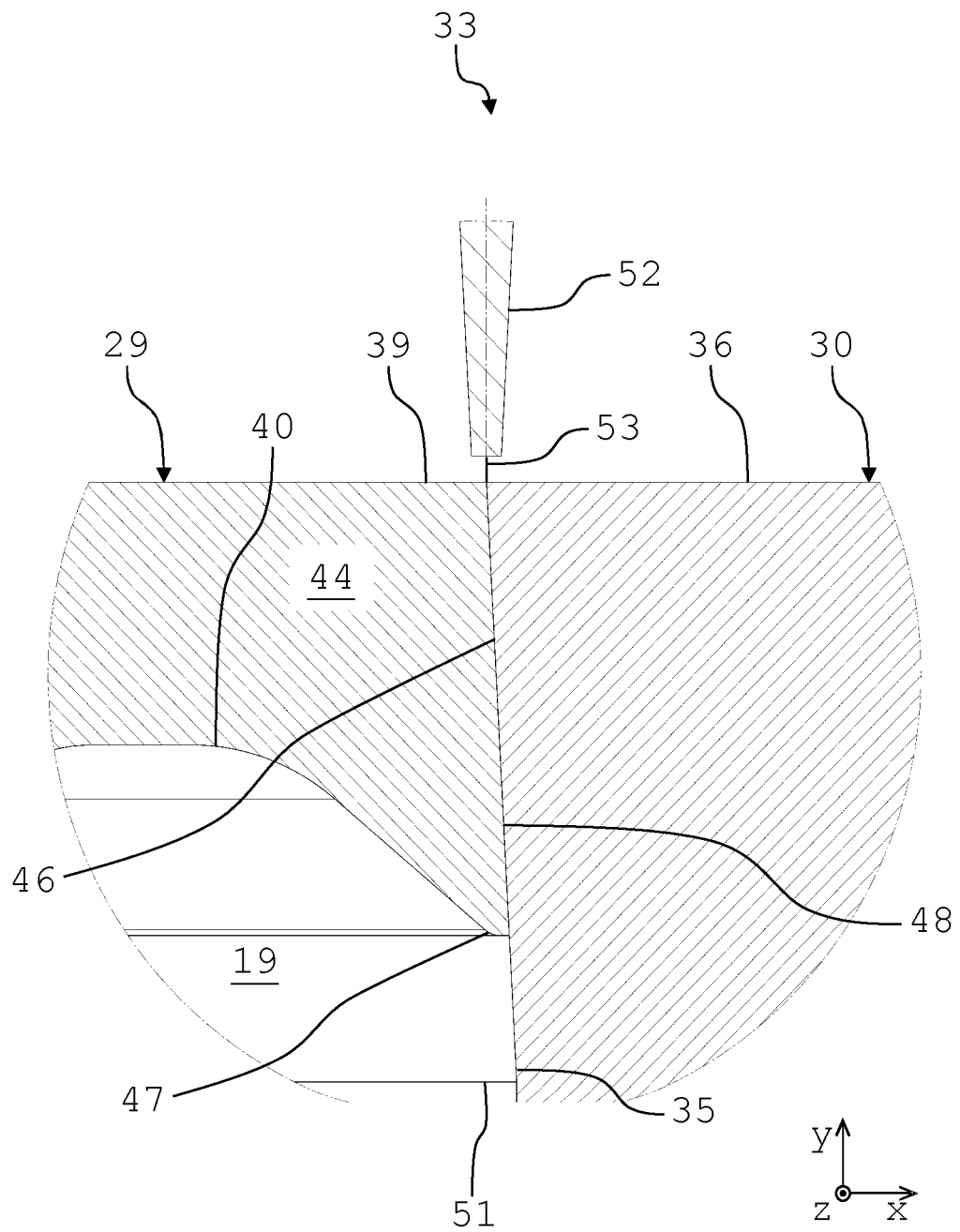
FIG. 9 again shows the detailed view VI according to FIG. 4.
Figure 10:
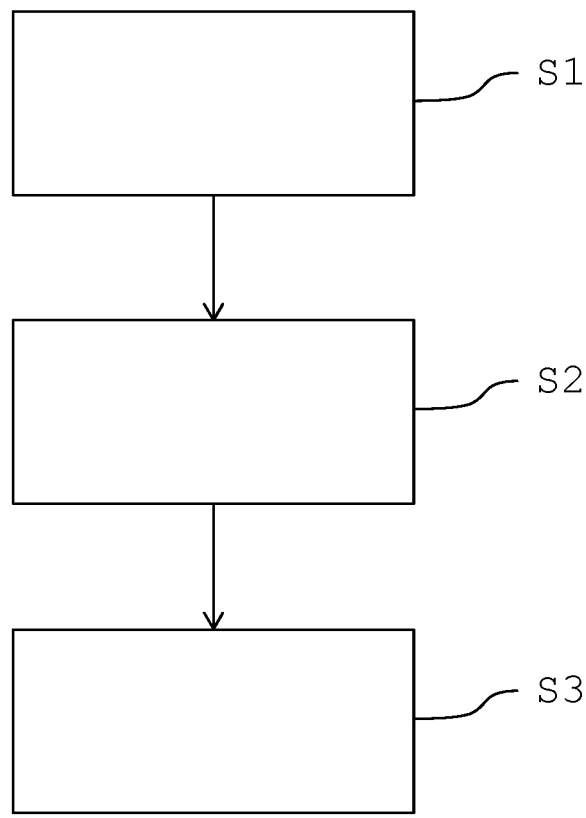
FIG. 10 shows a schematic block diagram of an embodiment of a method for producing the piston according to FIG. 2 using the piston blank according to FIG. 4.

FIG. 9 again shows the detailed view VI according to FIG. 4. FIG. 10 shows a schematic block diagram of an embodiment of a method for producing the piston 8 by means of the piston blank 33. In the following, reference is made to FIGS. 9 and 10 at the same time.

In the method, the piston blank 33 is provided in a step S1. In this case, the piston blank 33 comprises the piston lower part 29 with the first joining surface 46 and the piston upper part 30 with the second joining surface 48. Providing the piston blank 33 may comprise manufacturing the piston lower part 29 and/or the piston upper part 30. For example, the piston lower part 29 and/or the piston upper part 30 may be manufactured using a casting method. Machining of the piston lower part 29 and/or the piston upper part 30 is also possible.

In a step S2, the piston upper part 30 is placed with its second joining surface 48 on the first joining surface 46 of the piston lower part 29. Here, as previously mentioned, an interference fit can be provided between the piston upper part 30 and the piston lower part 29. That is, the piston upper part 30 can be pressed onto the piston lower part 29 in step S2.

In a step S3, the piston lower part 29 is welded to the piston upper part 30 at the joining surfaces 46, 48 with the aid of a welding device 52, which is only shown in highly schematized form. The welding device 52 is in particular a laser welding device and can therefore also be referred to as such.

The welding device 52 is suitable for generating a laser beam 53 with the aid of which the joining surfaces 46, 48 are at least partially melted to produce the weld seam 31. The laser beam 53 lies in the tangential plane 49, so that, in the event that the joining surfaces 46, 48 are melted all the way into the cooling channel 19 in order to produce the weld seam 31, the laser beam 53 is guided into the piston upper part 30 at the transition 51 and not into the cooling channel 19. The laser beam 53 is thus preferably also inclined at the angle of inclination α with respect to the central axis 9. The laser beam 53 thus does not run through the cooling channel 19, but past it. This reliably prevents the formation of weld spatter inside the cooling channel 19.

Optionally, it is additionally possible to weld the piston lower part 29 and the piston upper part 30 to each other at the second end surface 37 of the piston upper part 30 and the shoulder 41 of the piston lower part 29. A weld seam produced in this case (not shown) preferably also runs completely around the central axis 9.

In the event that the piston lower part 29 and the piston upper part 30 are not welded to one another at the second end surface 37 and at the shoulder 41, it is possible for oil guided through the cooling channel 19 to emerge from the cooling channel 19 at the circumferential groove 32. Since the groove 32 is arranged below the ring field 27, viewed with respect to the y-direction y, the escaping oil can be diverted into an oil sump of the combustion engine 7. A fluid-tight connection of the piston lower part 29 and the piston upper part 30 at the second end surface 37 and at the shoulder 41 is therefore not absolutely necessary.

Although the present invention has been described with reference to examples of embodiments, it can be modified in a variety of ways.

LIST OF REFERENCE CHARACTERS

1 Vehicle
2 Body
3 Vehicle interior
4 Environment
5 Wheel
6 Wheel
7 Combustion engine
8 Piston
9 Central axis
10 Piston shaft
11 Piston head
12 Piston hub
13 Central axis
14 Shaft section
15 Shaft section
16 Wall section
17 Wall section
18 Interior
19 Cooling channel
20 Wall
21 Bore
22 Bore
23 Piston crown
24 Combustion chamber
25 Piston crown section
26 Combustion bowl
27 Ring field
28 Fire bar
29 Piston lower part
30 Piston upper part
31 Weld seam
32 Groove
33 Piston blank
34 Outer surface
35 Inner surface
36 End surface
37 End surface
38 Rib
39 End surface
40 Inner surface
41 Shoulder
42 Groove
43 Web
44 Web
45 Base section
46 Joining surface
47 Rounding
48 Joining surface
49 Tangential plane
50 Contact
51 Transition
52 Welding device
53 Laser beam
Q Heat
R Radial direction
S1 Step
S2 Step
S3 Step
x x-direction
y y direction
z z direction
α Angle of inclination

The invention claimed is:

1. A piston blank for a piston, comprising
a piston lower part, which comprises a first joining surface running around a central axis of the piston blank, and
a piston upper part, which comprises a second joining surface running around the central axis and an inner surface running around the central axis and adjoining the second joining surface as viewed along the central axis,
wherein the piston upper part can be placed with its second joining surface on the first joining surface, wherein a tangential plane which is assigned to the second joining surface is inclined relative to the central axis such that the tangential plane intersects the inner surface, and wherein the inner surface is part of a wall of a cooling channel provided between the piston lower part and the piston upper part, and the tangential plane does not intersect the cooling channel.

2. The piston blank according to claim 1, wherein the first joining surface is frustoconical, wherein the second joining surface is frustoconical, and wherein the inner surface is cylindrical at least in sections.

3. The piston blank according to claim 1, wherein the joining surfaces are designed in such a way that the piston lower part and the piston upper part can be joined at the joining surfaces with an interference fit.

4. The piston blank according to claim 1, wherein the tangential plane is arranged outside of the cooling channel.

5. The piston blank according to claim 1, wherein the joining surfaces end at the cooling channel or within the cooling channel.

6. The piston blank according to claim 1, wherein the tangential plane is inclined at an angle of inclination of 1 to 8° relative to the central axis.

7. The piston blank according to claim 1, wherein the piston lower part comprises a rounding adjoining the first joining surface.

8. The piston blank according to claim 1, wherein the piston lower part comprises a shoulder for placing the piston upper part onto the piston lower part, wherein the shoulder is arranged distance from the joining surfaces as viewed along the central axis.

9. The piston blank according to claim 8, wherein the shoulder comprises a groove running around the central axis, wherein the piston upper part comprises a rib running around the central axis, which rib can be received in the groove in order to connect the piston lower part to the piston upper part in a form-fitting manner.

10. The piston blank according to claim 9, wherein the groove and the rib each have a V-shaped geometry in cross section.

11. The piston blank according to claim 8, wherein a groove running around the central axis is provided at a level of the shoulder, wherein the groove is worked both partially into the piston lower part and partially into the piston upper part.

12. A piston comprising the piston blank according to claim 1, wherein the piston lower part and the piston upper part are welded to one another at the joining surfaces by means of a weld seam.

13. A method for manufacturing a piston by means of a piston blank, comprising the following steps:
a) providing the piston blank, which comprises a piston lower part, which comprises a first joining surface running around a central axis of the piston blank, and a piston upper part which comprises a second joining surface running around the central axis and an inner surface running around the central axis and adjoining the second joining surface as viewed along the central axis, wherein a tangential plane which is assigned to the second joining surface is inclined relative to the central axis in such a way that the tangential plane intersects the inner surface,
b) placing the piston upper part with its second joining surface on the first joining surface, and
c) welding the piston lower part to the piston upper part at the joining surfaces,
wherein the inner surface is part of a wall of a cooling channel provided between the piston lower part and the piston upper part, wherein the tangential plane does not intersect the cooling channel.

14. The method according to claim 13, wherein step c) is carried out in such a way that a laser beam generated during step c) for welding lies in the tangential plane.

* * * * *